United States Patent [19]  
Matsumoto et al.

[11] Patent Number: 4,759,980  
[45] Date of Patent: Jul. 26, 1988

[54] MAGNETIC RECORDING MEDIUM HAVING TWO TYPES OF POLYESTER BINDERS IN A MAGNETIC RECORDING LAYER

[75] Inventors: Ikuo Matsumoto; Kuniharu Fujiki; Satoshi Sekiya, all of Mito, Japan

[73] Assignee: Victor Company of Japan, Ltd., Yokohama, Japan

[21] Appl. No.: 17,257

[22] Filed: Feb. 12, 1987

[30] Foreign Application Priority Data

Feb. 13, 1986 [JP] Japan .................................. 61-27945

[51] Int. Cl.$^4$ .............................................. G11B 5/702
[52] U.S. Cl. .................................... 428/336; 427/128; 427/131; 252/62.54; 428/480; 428/694; 428/328; 428/329; 428/900
[58] Field of Search ............... 428/694, 900, 480, 695, 428/328, 329, 336; 252/62.54; 427/128, 131; 360/134–136

[56] References Cited

U.S. PATENT DOCUMENTS

| | | | |
|---|---|---|---|
| 4,152,485 | 5/1979 | Mizumura | 428/900 |
| 4,154,895 | 5/1979 | Ogawa | 428/900 |
| 4,546,044 | 10/1985 | Asano | 428/413 |
| 4,671,995 | 6/1987 | Sekiya | 428/694 |
| 4,699,817 | 10/1987 | Fujiki | 428/694 |

Primary Examiner—Ellis P. Robinson  
Attorney, Agent, or Firm—Lowe, Price, Leblanc, Becker & Shur

[57] ABSTRACT

A magnetic recording medium comprising a non-magnetic support and a magnetic recording layer formed on at least one side of the support. The layer is made of a composition which comprises two types of polyesters as a binder. The polyesters have glass transition temperatures of not lower than 50° C. and not higher than 10° C., respectively.

5 Claims, No Drawings

MAGNETIC RECORDING MEDIUM HAVING TWO TYPES OF POLYESTER BINDERS IN A MAGNETIC RECORDING LAYER

BACKGROUND OF THE INVENTION

1. Field of the Invention

This invention relates to magnetic recording mediums such as magnetic audio or video tapes, magnetic disks including floppy disks and hard disks, and the like.

2. Description of the Prior Art

Magnetic recording mediums are run in frictional contact with a magnetic head and thus, they are required to have a magnetic recording layer having high durability.

In order to enable one to make a durable recording layer, it is the ordinary practice to form a magnetic recording layer in which a binder has been thermally cured. For instance, a polyfunctional isocyanate compound is added, in a solvent, to a binder resin such as a vinyl chloride-vinyl acetate-vinyl alcohol copolymer, a polyurethane resin or nitro cellulose, along with a magnetic powder, thereby obtaining a magnetic paint. This paint is applied onto a non-magnetic support and thermally cured to form a magnetic coating layer with an improved film strength.

However, the thermal curing treatment is apt to involve disadvantages such as blocking and curling problems. With the thermosetting resin binders used above, the disadvantages involved by the curing are difficult to overcome. In order to avoid the curling problem, an additional annealing step is undesirably necessary.

SUMMARY OF THE INVENTION

It is accordingly an object of the invention to provide a magnetic recording medium in which two types of polyesters are used as a binder for a magnetic recording layer whereby the layer has high durability with a suitable degree of flexibility.

It is another object of the invention to provide a magnetic recording medium which ensures a good contact with a magnetic head with improved electromagnetic conversion characteristics.

It is a further object of the invention to provide a magnetic recording medium which is free of blocking and curling problems as will be caused by a thermal curing treatment.

The magnetic recording medium according to the invention comprises a non-magnetic support and a magnetic recording layer formed on at least one side of the support. The magnetic recording layer is made of a composition which comprises a ferromagnetic powder and a resin binder uniformly dispersing the powder therein and consisting essentially of one type of polyester having a glass transition temperature not lower than 50° C. and another type of polyester having a glass transition temperature not higher than 10° C. The ratio by weight of the polyester having a higher transition temperature to the polyester having a lower transition temperature is preferably from 9:1 to 6:4.

DETAILED DESCRIPTION AND EMBODIMENTS OF THE INVENTION

The magnetic recording layer of the medium according to the invention is characterized by a resin binder which consists essentially of two types of polyesters. One type should have a glass transition temperature not lower than 50° C. Although any polyesters having the defined range of glass transition temperature may be used, preferable polyesters are those which are prepared from aromatic dicarboxylic acids such as phthalic acid, terephthalic acid, isophthalic acid and the like and glycols such as ethylene glycol, neopentyl glycol and the like. These dicarboxylic acids and glycols may be used singly or in combination, respectively. Preferably, the polyester has a molecular weight of from 15,000 to 25,000. On the other hand, another type should have a glass transition temperature not higher than 10° C. In this case, any polyesters may be used provided that they have a glass transition temperature of 10° C. or below. Preferable polyesters of this type are ones which are prepared from aliphatic dicarboxylic acids such as sebacic acid, adipic acid and the like and glycols such as ethylene glycol, neopentyl glycol and the like. In this case, the aliphatic dicarboxylic acids and the glycols may be, respectively, used singly or in combination. The molecular weight of this type of polyester is preferably from 15,000 to 25,000. Both types of polyesters may be commercially available, for example, from Toyobo Co., Ltd. of Japan under the name of Vylon.

In the practice of the invention, the polyester having a higher glass transition temperature is used in larger amounts than the other type of polyester. In general, the ratio by weight of a polyester having a higher glass transition temperature to a polyester having a lower glass transition temperature is in the range of 9:1 to 6:4.

The ferromagnetic powders used in the present invention may be any magnetic metal or metal oxide powders ordinarily used in this art and include, for example, ferromagnetic iron oxides such as gamma-$Fe_2O_3$ and $Fe_3O_4$ with or without being deposited with Co, Ni, Mn and the like, ferromagnetic metals such as Co, Ni, Fe and alloys thereof such as Fe-Co, Fe-Ni, Co-Ni, Fe-Co-Ni, and other ferromagnetic materials such as $CrO_2$, barium ferrite and the like. As is known in the art, these magnetic powders are preferably used in an amount of 200 to 1,000 parts by weight, most preferably from 300 to 600 parts by weight, per 100 parts by weight of the binder. These powders are preferably finely divided to have a size of from 0.2 to 0.4 micrometers.

Aside from the above essential ingredients, other various additives such as, for example, dispersing agents, lubricants, abrasive powders, antistatic agents and the like, may be added to the magnetic recording layer.

For the manufacture of the magnetic recording medium, a ferromagnetic powder and, if necessary, other additives are dispersed in a resin binder and a solvent for the binder by the use of a suitable mixing or kneading means. The resulting magnetic paint is coated onto a non-magnetic support at least on one side thereof, and is dried under conditions of a temperature of, for example, 40° to 80° C. for a time sufficient for the drying. The coating may be effected by any known techniques such as spin coating, air knife coating, blade coating, dip coating, various roll coatings, spray coating and the like. The magnetic recording layer is generally coated in the range of from 1.5 to 4.0 micrometers.

Non-magnetic supports may be in the form of disks, films, foils or sheets of a variety of materials including, for example, synthetic or semi-synthetic resins such as polyesters, polyimides, polyphenylene sulfides, polyolefins, cellulose derivatives and the like, metals such as aluminum, magnesium, copper and the like, glasses and ceramics.

The present invention is more particularly described by way of examples.

EXAMPLE 1

One hundred parts by weight of a magnetic powder having a coercive force of 300 oersteds and a BET value of 15 m$^2$/g, 27 parts by weight of a polyester (Vylon 280, made by Toyobo Co., Ltd.) having a glass transition temperature of 60° C. and a molecular weight of 2×10$^4$, 3 parts by weight of a polyester (Vylon 530, by Toyobo Co., Ltd.) having a glass transition temperature of 10° C. and a molecular weight of 2×10$^4$, 6 parts by weight of an abrasive powder, and 5 parts by weight of a lubricant were dissolved and dispersed in 400 parts by weight of a mixed solvent of methyl ethyl ketone and toluene in equal amounts. The resulting magnetic paint was applied onto a polyethylene terephthalate film, dried and polished. Thereafter, the film was punched in the form of a disk having a diameter of 5.25 inches, thereby obtaining a floppy disk.

EXAMPLE 2

The general procedure of Example 1 was repeated using 21 parts by weight of the polyester having a glass transition temperature of 60° C. and 9 parts by weight of the polyesters with the lower glass transition temperature, thereby obtaining a floppy disk.

EXAMPLE 3

The general procedure of Example 1 was repeated using 18 parts by weight of the polyester with the higher glass transition temperature and 12 parts by weight of the polyester with the lower glass transition temperature, thereby obtaining a floppy disk.

Comparative Example 1

The general procedure of Example 1 was repeated except that 30 parts by weight of the polyester with the higher glass transition temperature was used without use of any polyester having a glass transition temperature of 10° C., thereby obtaining a floppy disk.

Comparative Example 2

The general procedure of Example 1 was repeated except that 30 parts by weight of a polyester (Vylon 103, by Toyobo Co., Ltd.) having a glass transition temperature of 30° C. instead of the mixture of the polyesters having glass transition temperatures of 60° C. and 10° C., respectively, thereby obtaining a floppy disk.

Comparative Example 3

The general procedure of Example 1 was repeated except that 15 parts by weight of a polyester (Vylon 200, by Toyobo Co., Ltd.) having a glass transition temperature of 50° C. and 15 parts by weight of a polyester (Vylon 103, by Toyobo Co., Ltd.) having a glass transition temperature of 30° C. were used instead of the polyesters of Example 1, thereby obtaining a floppy disk.

The floppy disks obtained in the foregoing examples and comparative examples were subjected to measurements of a reproduction output, a scratch load and the number of recording and reproducing pass cycles for durability.

The reproduction output was determined by recording a 1F signal and reproducing it, whereupon a reproduction output was measured and indicated as a relative value.

The scratch load was determined by subjecting a floppy disk to a contact-type scratch tester and a load of a stylus was measured at the time when a scratch defect reached the base film.

The number of recording and reproducing pass cycles were determined by the use of a recording and reproducing apparatus, Model JA-551, manufactured by Matsushita Electric and Industrial Co., Ltd.

The results are shown in the Table below.

|  | Reproduction Output (%) | Scratch Load (g) | Number of Pass Cycles for Durability |
| --- | --- | --- | --- |
| Example: |  |  |  |
| 1 | 100 | 110 | over 20,000,000 |
| 2 | 101 | 100 | over 20,000,000 |
| 3 | 103 | 95 | over 20,000,000 |
| Comparative Example: |  |  |  |
| 1 | 92 | 115 | 10,000,000 |
| 2 | 94 | 70 | 3,000,000 |
| 3 | 98 | 90 | 15,000,000 |

As will be apparent from the above results, the use of two types of polyesters having glass transition temperatures of 50° C. or over and 10° C. or below, respectively, contributes to improve the reproduction output and durability characteristics over the cases where one type of polyester or two types of polyesters having glass transition temperatures outside the range of the invention are used.

When a polyester having a glass transition temperature not lower than 50° C. and a polyester having a glass transition temperature not higher than 10° C. are used in combination, the resulting magnetic layer has a suitable degree of hardness and a suitable degree of flexibility, thus ensuring good contact with a magnetic head and a high reproduction output level. Moreover, the layer rarely suffers defects on the surface thereof with a significant improvement in the number of recording and reproducing cycles.

In contrast, with the medium of Comparative Example 1 in which the polyester having a glass transition temperature of 10° C. is not used, the magnetic coating layer is hard but does not have a suitable degree of flexibility, so that the reproduction output is small and the durability is poor.

The medium of Comparative Example 2 which makes use of only one polyester having an intermediate glass transition temperature, cannot impart suitable degrees of hardness and flexibility to the magnetic recording layer. Consequently, the reproduction output is small with a considerably small number of the recording and reproducing cycles.

The medium using two types of polyesters whose glass transition temperatures are outside the ranges of the invention as in Comparative Example 3 is totally inferior to those mediums of the present invention.

What is claimed is:

1. A magnetic recording medium which comprises a non-magnetic support and a magnetic recording layer formed on at least one side of said support, said layer being made of a composition which comprises a ferrmagnetic powder uniformly dispersed in a resin binder consisting essentially of two types of polyesters, one of which has a glass transition temperature not lower than 50° C. and the other of which has a glass transition temperature not higher than 10° C., the ratio by weight of the polyester having a higher glass transition temperature to the polyester having a lower glass transition temperature being in the range of 9:1 to 6:4.

2. A magnetic recording medium according to claim 1, wherein said magnetic recording layer has a thickness of from 1.5 to 4.0 micrometers.

3. A magnetic recording medium according to claim 1, wherein the two types of polyesters have, respectively, a molecular weight of from 15,000 to 25,000.

4. A magnetic recording medium according to claim 1, wherein the polyester having a higher glass transition temperature is one which is prepared from an aromatic dicarboxylic acid selected from the group consisting of phthalic acid, terephthalic acid, isophthalic acid and mixtures thereof and a glycol selected from the group consisting of ethylene glycol, neopentyl glycol and mixtures thereof, and the other polyester is one which is prepared from an aliphatic dicarboxylic acid selected from the group consisting of sebacic acid, adipic acid and mixtures thereof and a glycol selected from the group consisting of ethylene glycol, neopentyl glycol and mixtures thereof.

5. A magnetic recording medium according to claim 1, wherein the ferromagnetic powder is used in an amount of 200 to 1,000 parts by weight per 100 parts by weight of the resin binder.

* * * * *